United States Patent
Vashi et al.

(10) Patent No.: US 11,611,943 B2
(45) Date of Patent: Mar. 21, 2023

(54) APPLICATION AWARE ADJUSTMENT OF TRANSMISSION PARAMETERS

(71) Applicant: Apple Inc., Cupertino, CA (US)

(72) Inventors: Prashant H. Vashi, San Jose, CA (US); Ioannis Pefkianakis, San Jose, CA (US); Madhusudan Chaudhary, Campbell, CA (US); Rajesh Ambati, Los Altos Hills, CA (US); Thanigaivelu Elangovan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 17/301,582

(22) Filed: Apr. 8, 2021

(65) Prior Publication Data

US 2022/0330171 A1 Oct. 13, 2022

(51) Int. Cl.
*H04W 52/28* (2009.01)
*H04W 52/34* (2009.01)
*H04W 52/14* (2009.01)
*H04W 52/36* (2009.01)

(52) U.S. Cl.
CPC ....... *H04W 52/281* (2013.01); *H04W 52/146* (2013.01); *H04W 52/343* (2013.01); *H04W 52/367* (2013.01)

(58) Field of Classification Search
CPC ............ H04W 52/281; H04W 52/146; H04W 52/343; H04W 52/367
See application file for complete search history.

(56) References Cited

U.S. PATENT DOCUMENTS

| 2013/0169348 | A1 | 7/2013 | Shi | |
| 2015/0222312 | A1* | 8/2015 | Shi | H04B 1/3838 455/127.1 |
| 2017/0250718 | A1 | 8/2017 | Choi et al. | |
| 2021/0099194 | A1* | 4/2021 | Jadhav | H04B 1/3838 |
| 2021/0184714 | A1* | 6/2021 | Jadhav | H04W 52/143 |

FOREIGN PATENT DOCUMENTS

EP 3474609 4/2019

\* cited by examiner

*Primary Examiner* — John J Lee
(74) *Attorney, Agent, or Firm* — Fay Kaplun & Marcin, LLP

(57) ABSTRACT

A user equipment (UE) determines a transmission power for data transmission to a network. The UE determines a specific absorption rate (SAR) limit associated with the UE and determines a transmission power to be allocated to data transmissions based on one or more applications running on the UE and the SAR limit.

19 Claims, 4 Drawing Sheets

APPLICATION AWARE ADJUSTMENT OF TRANSMISSION PARAMETERS

BACKGROUND

A user equipment (UE) may be configured with a variety of wireless communication capabilities. Wireless communications may implicate various regulations and/or standards. For example, a regulatory entity may set a maximum specific absorption rate (SAR) limit to regulate exposure to radio frequency (RF) energy. Due to the SAR limit, the UE may implement various mitigation techniques related to the amount of RF energy emitted by the UE to ensure that the SAR associated with the UE does not exceed the SAR limit.

SUMMARY

Some exemplary embodiments are related to a processor of a user equipment (UE) configured to perform operations. The operations include determining a specific absorption rate (SAR) limit associated with the UE and determining a transmission power to be allocated to data transmissions based on one or more applications running on the UE and the SAR limit.

Other exemplary embodiments are related to a user equipment (UE) having a transceiver configured to communicate with a wireless network and a processor communicatively coupled to the transceiver and configured to perform operations. The operations include determining a specific absorption rate (SAR) limit associated with the UE and determining a transmission power to be allocated to data transmissions based on one or more applications running on the UE and the SAR limit.

DETAILED DESCRIPTION

Figure 1:
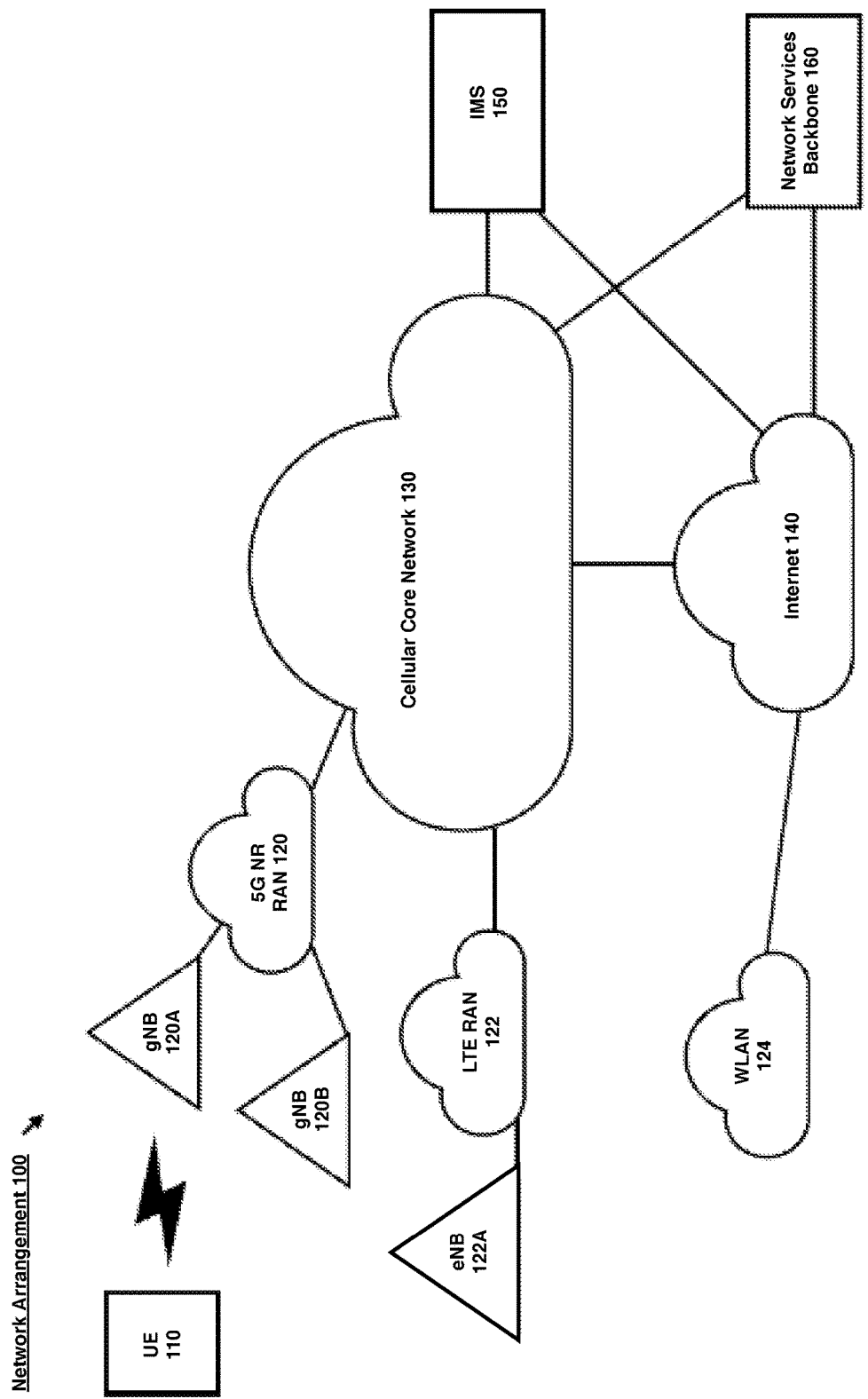
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe a device, system and method for managing the specific absorption rate (SAR) associated with a user equipment (UE) based on one or more applications running on the UE. SAR generally refers to a measure of the rate at which radio frequency (RF) energy is absorbed by the human body. Throughout this description, when SAR is used in reference to a metric, SAR represents power absorbed per mass of tissue and will be expressed in units of decibel-milliwatts (dBm).

Various standards and/or regulations may set a SAR limit (or threshold) to ensure that the user of a device is not exposed to an excess amount of RF energy. Accordingly, a person in proximity to a device will not be exposed to more than a predetermined threshold of RF energy, e.g., over a particular duration. The exemplary embodiments relate to a SAR limit that is based on the average SAR associated with the UE over a defined duration.

Thus, throughout this description, a SAR limit may refer to a predetermined threshold parameter that is to be compared to the average SAR associated with the UE during a time window. The duration of the time window may be based on any appropriate factor such as, for example, a timer of a predetermined duration, the occurrence of a predetermined type of event or predetermined set of criteria, the duration of a network connection, measurement data, a request, user input, any combination thereof, etc. However, any reference to the time window being a particular duration or the time window being dependent on any particular factor is merely provided for illustrative purposes, the exemplary embodiments may apply to a time window of any duration.

The SAR experienced at any location relative to the UE (e.g., a three-dimensional point measured relative to the UE (hereinafter referred to as the "SAR location")) may depend on various factors. These factors may include, but are not limited to, transmit power, the angle between the source (e.g., at least one antenna) and the SAR location, the presence of objects between the source and the SAR location, the distance between the source and the SAR location, etc. As a result, the RF energy emitted by UE from a source (e.g., at least one antenna) may cause a SAR of a first value at a first SAR location and a SAR of a second value at a second SAR location. To account for these variations, the UE may be subject to different SAR limits that are each relative to a different portion of the user (e.g., head, whole body, particular number of grams of tissue, wrist, arm, leg, etc.). Further, different types of UEs may be subject to different SAR limits. However, the exemplary embodiments are not limited to a SAR limit that is relative to any specific portion of the user.

From the UE perspective, RF energy is emitted from an antenna when a radio performs a transmission. A person of ordinary skill in the art would understand that there is a direct correlation between the value of various parameters that are utilized for the operation of the radio of the UE and the SAR associated with the UE. The exemplary embodiments will be described with regard to determining the SAR associated with the UE based on the transmit power and duty cycle utilized by a radio. However, a person of ordinary skill in the art would understand that other parameters associated with the operation of a radio may be used to determine the SAR associated with the UE.

Due to the correlation between transmit power and the SAR associated with the UE, the UE may ensure compliance with the SAR limit, at least in part, by limiting the transmit power parameter for a radio to a predetermined maximum. Thus, while the UE may be capable of utilizing a transmit power of a first value, the UE may limit itself to a maximum transmit power that is less than the first value (e.g., over a particular period of time). Throughout this description, the term allowed transmit power may generally refer to the maximum transmit power that the UE may utilize while remaining in compliance with the SAR limit.

Conventionally, to ensure that a UE complies with the SAR limit, a UE toggles between a maximum transmission power (e.g., which may be dependent on one or more of the UE capability, a network configuration, or regulatory requirements) and a fallback transmission power. During a time window, the UE will transmit at the maximum transmission power for a first duration and at the fallback transmission power for a second duration. Using this technique, the average transmission power for the time window complies with the SAR limit. However, the UE toggles between these two transmission powers irrespective of any running application(s) or those application's future power requirements.

As will be described in detail below, the exemplary embodiments relate to determining one or more transmission parameters based on SAR limits and one or more applications running on a UE. In some embodiments, the one or more parameters may be based on the type(s) of application (s) running on the UE. In other embodiments, the one or more parameters may alternatively or additionally be based on a duty cycle of the application(s) running on the UE. As a result, the transmission parameters are optimized based on the needs of the running application(s).

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UE being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Thus, either simultaneously or alternatively, the UE 110 may connect to the 5G NR-RAN 120 via the gNBs 120A and 120B. In the present example, it may be considered that the gNB 120A is part of CG1 and the gNB 120B is part of CG2. Thus, in DC operation, the UE 110 may be simultaneously connected to gNB 120 A (CG1) and gNB 120B (CG2). Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
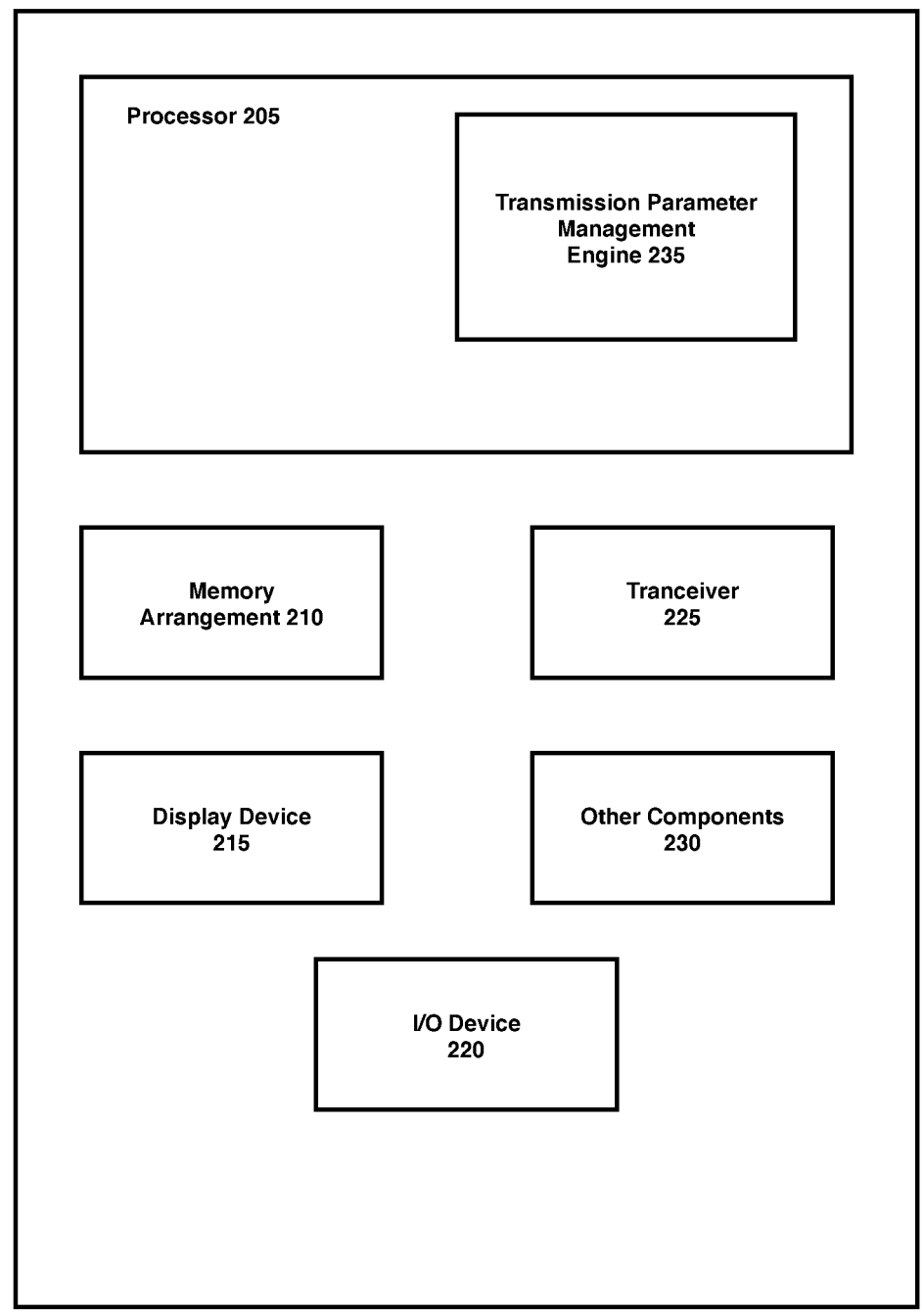
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a transmission parameter management engine 235. The transmission parameter management engine 235 may perform various operations related to determining one or more transmission parameters based on an application(s) running on the UE.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
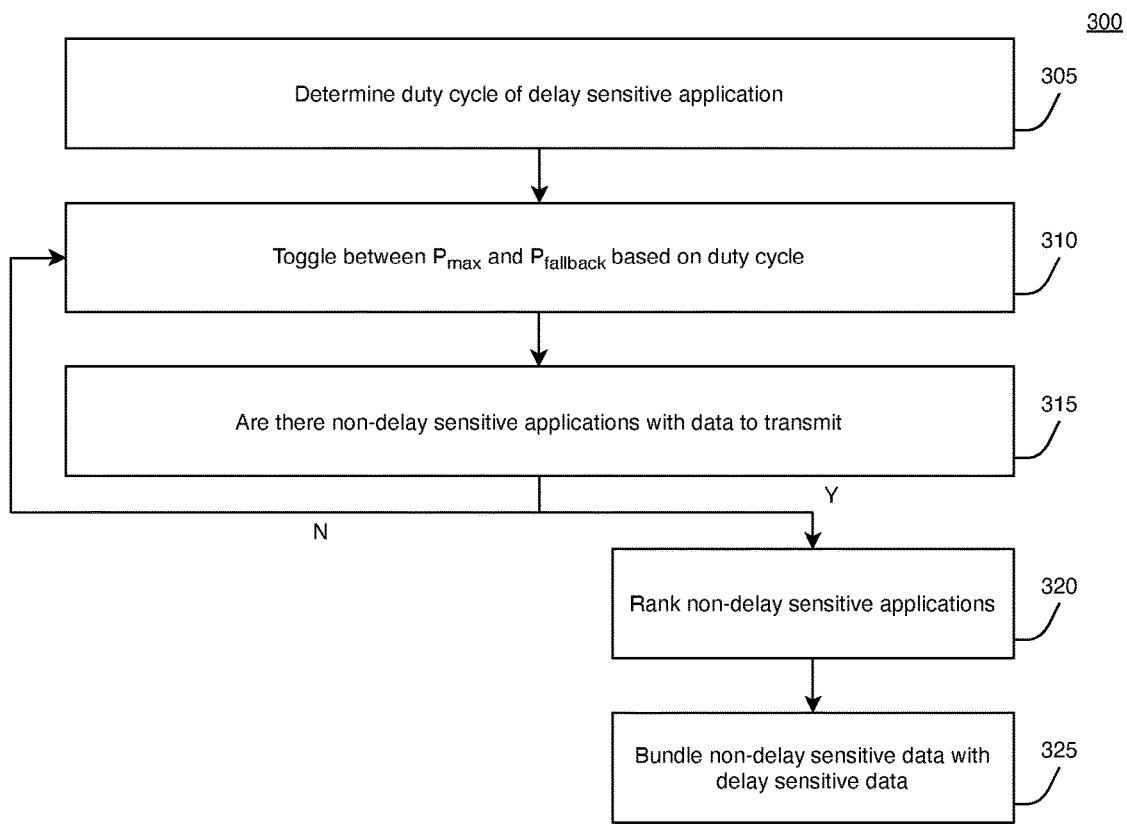
FIG. 3 shows an exemplary method for adjusting one or more transmission parameters based on a running application and the SAR associated with the UE over a time window according to various exemplary embodiments.

FIG. 3 shows an exemplary method 300 for adjusting one or more transmission parameters based on a running application and the SAR associated with the UE 110 over a time window according to various exemplary embodiments. It should be noted that the method 300 assumes that a delay sensitive application is running on the UE 110. A delay sensitive application may be, for example, voice calls such as voice over LTE (VoLTE) or real time applications such as Facetime (audio/video). The method 300 prioritizes delay sensitive upload traffic by changing the allowed transmission power (P) to a maximum transmission power ($P_{max}$) and then back to a fallback transmission power ($P_{fallback}$) based on the duty cycle of the delay sensitive application. As a result, the UE 110 ensures that it complies with the SAR limit for a given time window while ensuring the maximum transmission power is allocated to delay sensitive traffic.

In 305, the UE 110 determines the duty cycle of the delay sensitive application. For example, if the delay sensitive application is VoLTE, the duty cycle may be 40 ms, e.g., the UE 110 will have an uplink voice to transmit every 40 ms. It should be understood, however, that different applications may have correspondingly different duty cycles and the 40 ms duty cycle of VoLTE is only exemplary.

Figure 4:
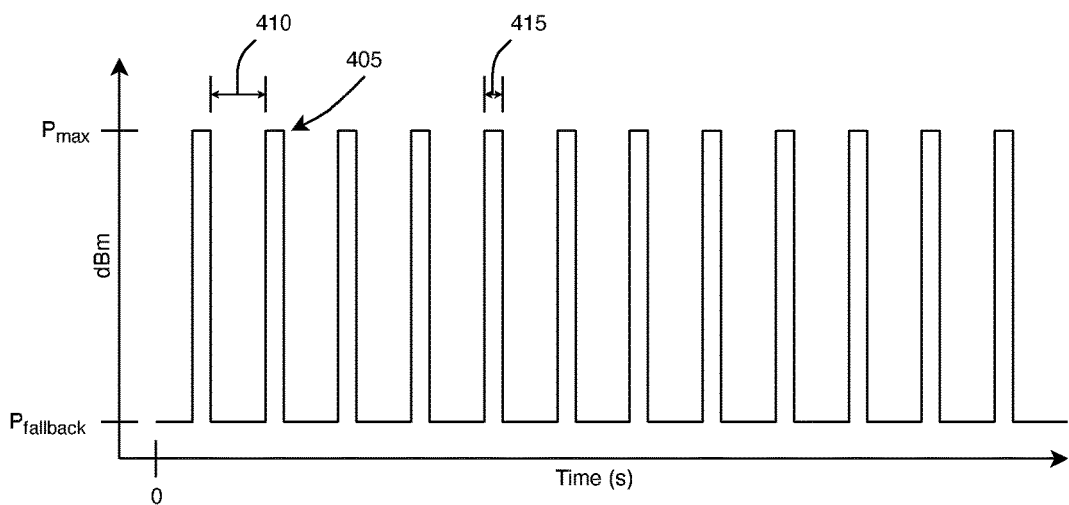
FIG. 4 shows a graph that illustrates the adjustment of transmission parameters using the method of FIG. 3.

In 310, the UE 110 toggles between $P_{max}$ and $P_{fallback}$ for the allowed transmission power based on the duty cycle determined in 305. This is illustrated in FIG. 4, which shows a graph that illustrates the adjustment of transmission parameters using the method 300. As illustrated in FIG. 4, the UE 110 changes the allowed transmission power based on the duty cycle, which is the time period 410 between the peaks 405. More specifically, the UE 110 changes the allowed transmission power to $P_{max}$ every time there is a package to be transmitted. For example, assuming the 40 ms duty cycle of VoLTE, the UE 110 changes the allowed transmission power for $P_{max}$ every 40 ms. The UE 110 will maintain this $P_{max}$ allowed transmission power for a transmission time period 415 necessary to transmit the package. So, in the VoLTE example, this time period is about 1 ms. After the transmission time period has elapsed, the UE 110 changes the allowed transmission power back to $P_{fallback}$.

As such, the UE 110 adjusts the timing of the $P_{max}$ allocation and the reversion back to $P_{fallback}$ based on the duty cycle of the delay sensitive application. However, it should be noted that although the UE 110 allocates the maximum power $P_{max}$ for the delay sensitive transmission (s), the actual transmission power used to transmit the package(s) is not necessarily equal to $P_{max}$ for every package transmission. For example, if the UE 110 is near a base station (e.g., gNB 120A) with a clear line of sight, it may not be necessary to use $P_{max}$ to transmit a data package to the base station. In addition, the actual transmission power may also be dependent on other factors such as, for example, pathloss, inter-cell interference, etc. Thus, $P_{max}$ is the maximum allowed transmission power, but may not necessarily be the actual transmission power.

Returning to FIG. 3, in 315, the UE 110 determines if there are any non-delay sensitive applications running that have data to transmit. If there are no such applications running on the UE 110, then the method 300 ends. That is, the data packages of the delay sensitive application are transmitted per the duty cycle of the delay sensitive application and the maximum allowed power is allocated for the transmission of these packages. However, if, at 315, the UE 110 determines that there are non-delay sensitive applications running that need to transmit data, then the UE 110 may rank these applications based on some predetermined criteria. If there is only one non-delay sensitive application with data to be transmitted, then the ranking may be skipped.

If there is available power headroom after accounting for the transmission of the delay sensitive data, then the UE 110, in 325, may bundle the non-delay sensitive data with the delay sensitive data. In some embodiments, the UE 110 may determine which of the non-delay sensitive data to bundle with the delay sensitive data based on the ranking at 320. In some embodiments, if there is enough power headroom available, the UE 110 may bundle all of the non-delay sensitive data with the delay sensitive data. As a result, any non-delay sensitive data is transmitted together with the delay sensitive data and may advantageously take advantage of the higher transmission power $P_{max}$ allocated for the delay sensitive data.

Figure 5:
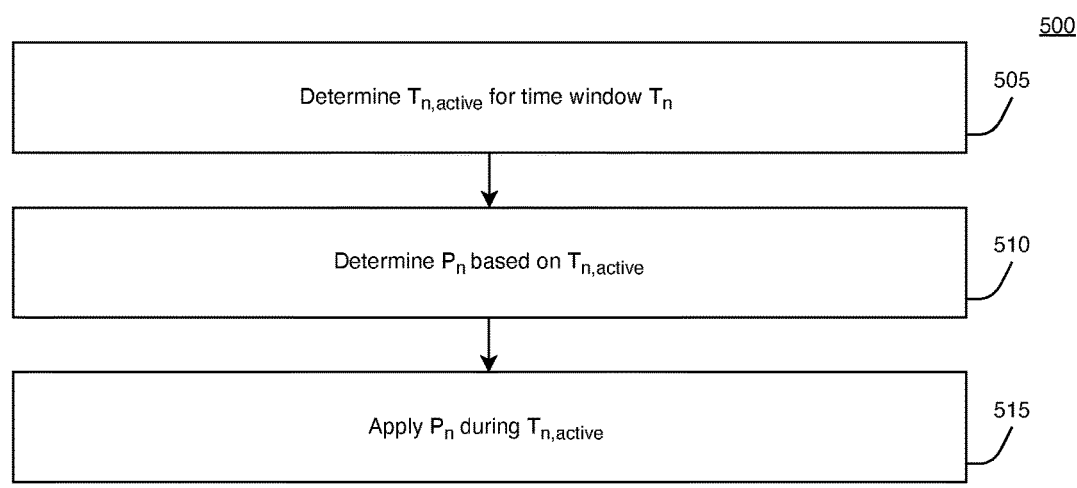
FIG. 5 shows an exemplary method for adjusting one or more transmission parameters based on a running application and the SAR associated with the UE over a time window according to various exemplary embodiments.
Figure 6:
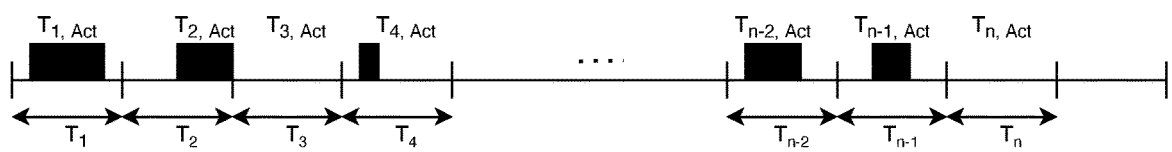
FIG. 6 shows a diagram that illustrates the adjustment of transmission parameters using the method of FIG. 5.

FIG. 5 shows an exemplary method 500 for adjusting one or more transmission parameters based on a running application and the SAR associated with the UE over a time window according to various exemplary embodiments. The method 500 determines a maximum transmission power allocation for a given time window based on previous duty cycle(s). The following description of the method 500 will also be made with reference to FIG. 6, which illustrates the adjustment of transmission parameters using the method 500.

In 505, the UE 110 determines an active time period ($T_{n,act}$) for an upcoming time window ($T_n$). The UE is configured to determine $T_{n,act}$ based on previously observed active time periods ($T_{1,act}$-$T_{n-1,act}$) corresponding to previous time windows ($T_1$-$T_{n-1}$). In some embodiments, for example, the UE 110 may use a weighted moving average prediction algorithm, which is based on a weighted moving average of previously observed active time periods ($T_{1,act}$-$T_{n-1,act}$), to estimate $T_{n,act}$. For example, the weighted moving average prediction algorithm may be provided using the equation $Est_{active}=(1-\alpha)\cdot Est_{active}+\alpha\cdot active$, where $\alpha=\frac{1}{8}$. It should be noted, however, that $\alpha$ may have other values, e.g., $\alpha$ may be any weighting value from 0 to 1. $Est_{active}$ is a weighted moving average that is a T(n,act) prediction. Active is the active time in the last time window Tn−1.

In some embodiments, the UE 110 may alternatively use a drift method to determine $T_{n,act}$. In such an embodiment, the UE 110 estimates a drift (the amount of change over time). As such, $T_{n,act}$ based on the determined drift and $T_{n-1,act}$. In some embodiments, the drift may be used to determine $T_{n,act}$ in time period $T_n$ based on the drift and $T_{n-1,act}$ in time period $T_{n-1}$ using the equation $$Est_{active}^{T_n} = T_{n-1,act} + \frac{1}{T_{n-1}-1} \cdot \sum_{i=2}^{T_{n-1}} T_{i,act} - T_{active,i-1}.$$

In some embodiments, the UE may alternatively use an autoregressive integrated moving average (ARIMA), which is a combination of the differenced autoregressive model with the moving average model.

Returning to FIG. 5, at 510, the UE 110 determines the transmission power ($P_n$) that will be allocated to the time window (Td that will be allocated based on the $T_{n,act}$ determined in 505. In some embodiments, the transmission power ($P_n$) may be determined using the equation $$P_n = \frac{T_n \cdot P_{limit}}{T_{n,act}},$$

where $P_{limit}$ is the SAR limit, $T_n$ includes the idle time and the active time during time period $T_n$, and $P_{limit} \leq P_n \leq P_{max}$. If, for example, there is no idle time during a time window, then the entire time window is considered an active time. In such a scenario, $P_n$ would be the $P_{limit}$ dictated by the SAR limit.

At 515, the UE 110 allocates the transmission power ($P_n$) during the estimated active time ($T_{n,act}$). Although this power is greater than the SAR limit, it is applied to the active time period, which is less than the time window for which the SAR limit is defined. As such, when the average transmission power for the time window is calculated, it will comply with the SAR limit. As a result, the UE 110 allocates a greater allowable transmission power during times when running applications are expected to need to transmit data.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

Those skilled in the art would understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above-described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   determining a specific absorption rate (SAR) limit associated with the UE;
   determining a maximum transmission power to be allocated to data transmissions based on one or more applications running on the UE and the SAR limit, the one or more application comprising at least a delay sensitive application;
   determining a duty cycle of the delay sensitive application;
   allocating the maximum transmission power for data transmissions of the delay sensitive application based on the duty cycle; and
   toggling between the maximum transmission power and a fallback transmission power based on the duty cycle, wherein the fallback transmission power is less than the maximum transmission power.

2. The processor of claim 1, wherein the maximum transmission power is based on a UE capability.

3. The processor of claim 1, wherein the operations further comprise:
   determining if the one or more applications further include one or more non-delay sensitive applications; and
   when the one or more delay sensitive applications include one or more non-delay sensitive applications, bundling non-delay sensitive data with delay sensitive data.

4. The processor of claim 3, wherein when the one or more non-delay sensitive applications include a plurality of non-delay sensitive applications, the operations further comprise:
   ranking the plurality of non-delay sensitive applications based on a predetermined criteria,
   wherein bundling the non-delay sensitive data is based on the ranking.

5. The processor of claim 1, wherein the delay sensitive application is a voice over long-term evolution (VoLTE) application.

6. The processor of claim 5, wherein the duty cycle is associated with an uplink transmission of voice data.

7. The processor of claim 1, wherein the maximum transmission power is based on a network configuration of the UE.

8. The processor of claim 1, wherein the maximum transmission power is based on a regulation associated with the UE.

9. A user equipment (UE), comprising:
   a transceiver configured to communicate with a wireless network; and a processor communicatively coupled to the transceiver and configured to perform operations comprising:

determining a specific absorption rate (SAR) limit associated with the UE;

determining a maximum transmission power to be allocated to data transmissions based on one or more applications running on the UE and the SAR limit, the one or more application comprising at least a delay sensitive application;

determining a duty cycle of the delay sensitive application;

allocating the maximum transmission power for data transmissions of the delay sensitive application based on the duty cycle; and toggling between the maximum transmission power and a fallback transmission power based on the duty cycle, wherein the fallback transmission power is less than the maximum transmission power.

10. The UE of claim 9, wherein the maximum transmission power is based on a UE capability.

11. The UE of claim 9, wherein the operations further comprise:

determining if the one or more applications further include one or more non-delay sensitive applications; and bundling non-delay sensitive data with delay sensitive data.

12. The UE of claim 11, wherein when the one or more non-delay sensitive applications include a plurality of non-delay sensitive applications, the operations further comprise:

ranking the plurality of non-delay sensitive applications based on a predetermined criteria, wherein bundling the non-delay sensitive data is based on the ranking.

13. The processor of claim 9, wherein the delay sensitive application is a voice over long-term evolution (VoLTE) application and wherein the duty cycle is associated with an uplink transmission of voice data.

14. The processor of claim 9, wherein the maximum transmission power is based on a network configuration of the UE.

15. The processor of claim 9, wherein the maximum transmission power is based on a regulation associated with the UE.

16. A processor of a user equipment (UE) configured to perform operations comprising:

determining a specific absorption rate (SAR) limit associated with the UE;

determining a transmission power to be allocated to data transmissions based on one or more applications running on the UE and the SAR limit; and determining an estimated active time period for an upcoming time window based on one or more previously observed active time periods of a corresponding one or more time windows, wherein the transmission power is determined based on the estimated active time period.

17. The processor of claim 16, wherein the estimated active time period is determined using a predetermined algorithm.

18. The processor of claim 16, wherein the operations further comprise:

allocating the transmission power to data transmitted during the estimated active time period.

19. The processor of claim 16, wherein the transmission power is greater than or equal to the SAR limit and less than or equal to a maximum transmission power of the UE.

* * * * *